March 11, 1941. C. F. HAUNZ 2,234,732
STORAGE BATTERY ELECTRODE
Filed April 13, 1937

INVENTOR.
CHARLES F. HAUNZ.
BY Allen & Allen
ATTORNEYS.

Patented Mar. 11, 1941

2,234,732

UNITED STATES PATENT OFFICE 2,234,732

STORAGE BATTERY ELECTRODE

Charles F. Haunz, Maywood, Ill., assignor to The Richardson Company, Lockland, Ohio, a corporation of Ohio Application April 13, 1937, Serial No. 136,640

4 Claims. (Cl. 136—53)

My invention has to do with electrical storage batteries of all types; but I shall describe it in connection with electric storage batteries of the lead-acid type, it being understood that my invention is not so limited otherwise than as set forth in the appended claims.

My invention has to do with the problems of providing a more active surface, of providing a greater quantity of active material whereby the capacity of the storage battery for a given volume can be increased, and the problem of rendering masses of active ingredients, such for example, as oxides of lead in a lead-acid type storage battery, more conductive.

These and other objects of my invention which will be set forth hereinafter or will be apparent to one skilled in the art upon reading these specifications, I accomplish by that certain structure and arrangement of parts and by that process of which I shall now describe the aforesaid exemplary embodiment. Reference is made to the drawing in which the two figures show in vertical section different forms of battery electrodes.

In the practice of my invention, I make use of filamentary metals, and I employ these filamentary metals for several purposes. One such purpose is that of rendering a mass of active materials, such for example, as oxides of lead in a lead-acid type storage battery more conductive. Another such purpose is that of binding together by interlaced or intermixed metallic filaments a mass of active materials into a unitary structure of enhanced electrical conductivity. A third such purpose is the use of filamentary metals adapted to be converted into active materials whereby the active materials may be increased in amount or replenished during the operation of the storage battery. A fourth such purpose is the provision of novel types of battery electrodes.

This application is continuation in part of my copending applications Serial No. 136,638 filed April 13, 1937, and Serial No. 136,639 filed April 13, 1937.

Figure 1:
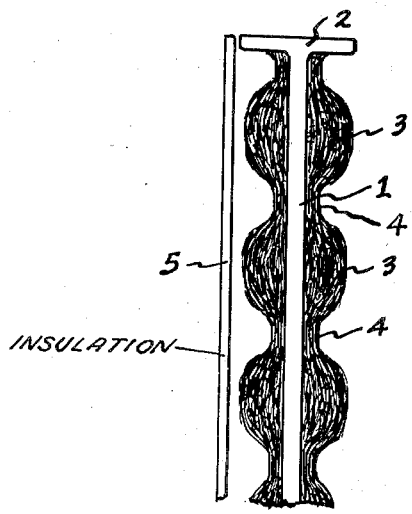
Figure 1 shows a type of electrode embodying my invention.

In the practice of my invention, I provide metals in filamentary form for the purposes indicated. Metallic filaments may be formed in any suitable way, but are preferably formed in accordance with the teachings of my said copending application Serial No. 136,638 and by the use of an apparatus essentially set forth in the co-pending application of Adolph F. Krauss, Serial No. 96,124, filed August 14, 1936. In accordance with the teachings of this application I prefer to manufacture the metallic filaments by providing a rotating head having very fine passageways therein. The molten metal to be formed into filaments is preferably supplied to the rotating head, and under the influence of centrifugal force passes out through the fine passageways and is caught in a hopper. The hopper is maintained dry and should be of such size as to permit solidification of the metallic filaments by cooling before they are pressed together by their own weight or by impact against the walls of the hopper. It is possible by the means referred to, to produce for example lead or antimonial lead filaments which have high matting or cohering qualities and a very fine dimension, such that they are excellently adaptable to my invention. Thus I have employed lead filaments or hairs which are on the average of a diameter of .003 to .007 inch, and of a length up to ¾ inch, together with finer materials.

For use in a lead-acid type storage battery, I prefer to form my inert metallic filaments of antimonial lead, that is to say, lead containing sufficient antimony to render it substantially inert to storage battery electrolyte. For a non-inert type of filament I prefer to use substantially pure lead. Other metallic filaments may be used for the purposes hereinafter set forth in a lead-acid type of battery; and for other types of batteries such as the nickel-alkali and others, filaments of nickel, iron and other substances may be employed.

Due to the inclusion of the filaments, matted metallic structures may be made having a fair degree of inherent strength while obtaining great activity.

The practice of my invention contemplates the admixture of metallic filaments with the active ingredients of a storage battery electrode. This may be accomplished in several ways. The active ingredients may be mixed in the beginning with inert metallic filaments. A structure of inert metallic filaments may be made and the active materials deposited in or on such structure by any means desired. A mixture of active materials and non-inert filaments may be made. A mixture of inert metallic filaments and non-inert metallic filaments may be made and formed into an electrode after which the non-inert metallic filaments may be converted into active materials by electrolytic action. Likewise, it is also possible to mix together inert metallic filaments, non-inert metallic filaments and a proportion of active ingredients. Under these conditions of the operation of the storage battery, the non-inert metallic filaments may be converted into active materials to add to or to replenish the supply of active materials in the electrode.

In Fig. 1, which is an elevational view of an electrode, I have shown a type of electrode comprising a conductive member 1 of relatively thin cross section having a terminal member 2. 3 indicates an intermixed mass of metallic filaments with or without conventional active ingredients, as by pressing, hammering, partial or complete fusion, etc. The filaments may be associated with the member 1 at intervals, as at 4. This gives a substantially self supporting structure. A battery separator is indicated at 5.

Figure 2:
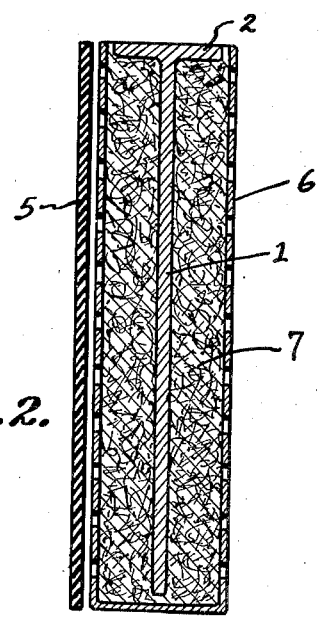
Figure 2 shows still another type of electrode embodying an envelope and a central conductor.

In Fig. 2, which is a sectional view of a somewhat different electrode I have indicated the same conductive member at 1 and 2. This member, however, is contained in a pervious envelope 6 and within the envelope and about the member 1 there is packed the combination of inert metallic filaments and other materials as aforesaid. This is indicated at 7. A separator is again indicated at 5.

The pervious envelope may be of perforated or slotted metal but will preferably be of some insulating substance which is either pervious to the electrolyte or is perforated at intervals, as shown.

Figure 3:
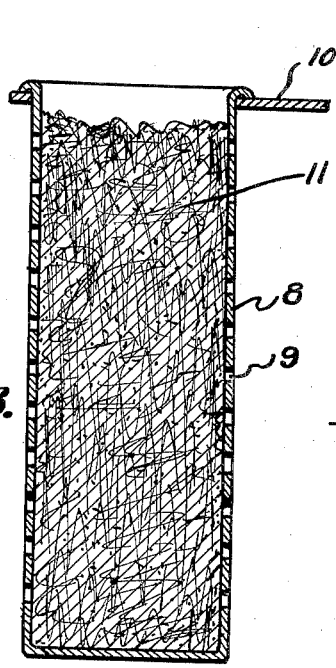
Figures 3 and 4 show envelope type electrodes without central conductors and with different terminal arrangements.

In Fig. 3 I have indicated at 8 a conductive envelope, e. g. a cast or rolled envelope of antimonial lead in a lead-acid battery. The envelope is provided with slots or perforations 9. The several parts in this figure are shown in section. It may be joined to a strap-like conductor or terminal member 10. No internal conductive plate or the like need be used in this structure. The envelope 8 need only be filled with the mixture of metallic filaments and active materials.

Figure 4:
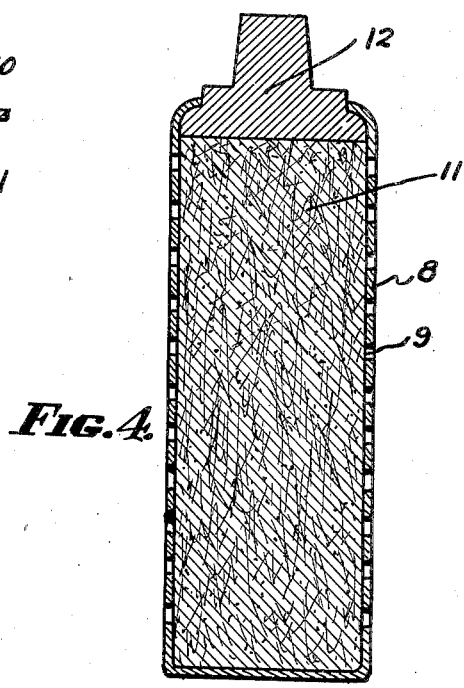

In Fig. 4, again a sectional view, like numerals have been used to designate like parts. The envelope 8 is fitted with a metallic plug 12 serving as a terminal and the envelope is joined to the plug in any suitable way.

Modifications may be made in my invention without departing from the spirit thereof.

Having thus described my invention, what I claim as new and desire to secure by Letters Patent is:

1. In an electric storage battery an electrode structure comprising a pervious envelope, a conductive member in said envelope and a packing in said envelope and surrounding said conductive member, said packing comprising antimonial lead in filamentary form, substantially pure lead in filamentary form, and oxides of lead.

2. In an electric storage battery an electrode structure comprising a pervious envelope, a conductive member in said envelope and a packing in said envelope and surrounding said conductive member, said packing comprising antimonial lead in filamentary form, and oxides of lead.

3. In an electric storage battery, an electrode structure comprising a perforated, conductive, metallic envelope, means for making electrical contact with said envelope, and a packing in said envelope comprising a mixture of oxides of lead and filaments of antimonial lead.

4. In an electric storage battery an electrode structure comprising a perforated, conductive, metallic envelope, means for making electrical contact with said envelope, and a packing in said envelope comprising antimonial lead in filamentary form, substantially pure lead in filamentary form, and oxides of lead.

CHARLES F. HAUNZ.